United States Patent [19]

Nubel et al.

[11] Patent Number: 5,519,101
[45] Date of Patent: May 21, 1996

[54] PROCESS FOR PREPARATION OF UNSATURATED OLIGOMERS OR POLYMERS BY ACYCLIC OLEFIN METATHESIS

[75] Inventors: Philip O. Nubel, Naperville; Vahid Bagheri, Lisle, both of Ill.

[73] Assignee: Amoco Corporation, Chicago, Ill.

[21] Appl. No.: 68,240

[22] Filed: May 27, 1993

[51] Int. Cl.$^6$ .............................. C08G 61/04; C07C 6/00
[52] U.S. Cl. .................... 526/142; 526/139; 526/140; 526/141; 526/161; 526/166; 526/169; 526/336; 585/643; 585/645; 585/647
[58] Field of Search .................... 526/336, 141, 526/139, 140, 142, 161, 166, 169; 585/643, 645, 647

[56] References Cited

U.S. PATENT DOCUMENTS

| | | | |
|---|---|---|---|
| 3,514,437 | 5/1970 | Henderson | 526/142 |
| 3,597,403 | 8/1971 | Ofstead | 260/88.2 |
| 3,597,406 | 8/1971 | Calderon | 260/93.1 |
| 3,798,175 | 3/1974 | Streck et al. | 252/429 B |
| 3,857,825 | 12/1974 | Streck et al. | 260/88.1 R |
| 3,935,179 | 1/1976 | Ofstead | 260/93.1 |
| 3,974,092 | 8/1976 | Streck et al. | 252/429 B |
| 3,974,094 | 8/1976 | Streck et al. | 252/429 B |
| 4,010,224 | 3/1977 | Scott et al. | 260/878 R |
| 4,020,254 | 4/1977 | Ofstead | 526/128 |
| 4,172,932 | 10/1979 | Ofstead et al. | 526/142 |
| 4,429,089 | 1/1984 | Pedretti et al. | 526/153 |
| 4,469,809 | 9/1984 | Klosiewicz | 502/117 |
| 4,520,181 | 5/1985 | Klosiewicz | 525/247 |
| 4,699,963 | 10/1987 | Klosiewicz | 526/142 |
| 4,918,039 | 4/1990 | Martin | 502/113 |
| 4,977,226 | 12/1990 | Sugawara et al. | 526/112 |

OTHER PUBLICATIONS

Hackh's Chemical Dictionary, 4th ed., McGraw–Hill, Inc., N.Y., pp. 35, 320, 321.

Hackh's Chem. Dictionary, J. Grant (ed.) McGraw–Hill Co., Inc., N.Y., 16 (1969).

Schrock, et al., "Preparation and Reactivity of Several Alkylidene Complexes of the Type W(CHR') (N–2, 6–$C_6H_3$–i–$Pr_2$) $(OR)_2$ and Related Tungstacyclobutane Complexes. Controlling Metathesis Activity through The Choice of Alkoxide Ligand", *J. Am. Chem. Soc.*, 1988, pp. 1423–1435.

Wagener et al., *Makromol. Chem.* 191, pp. 365–374 (1990).

K. J. Ivin, *Olefin Metathesis*, 1983, p. 149.

Kirk–Othmer, *Encyclopedia of Chemical Technology*, Third Edition, vol. 8, Diuretics to Emulsions, p. 597.

K. Ichikawa and K. Fukuzumi, *Metathesis of 1–Alkene*, 1976, pp. 2633–2635.

*Primary Examiner*—Fred Teskin
*Attorney, Agent, or Firm*—Thomas E. Nemo; Ronald S. Courtney; Wallace L. Oliver

[57] ABSTRACT

A polymerization process for preparation of oligomers and polymers having at least one internal carbon-to-carbon double bond and containing functional groups comprising terminal carbon-to-carbon double bonds is disclosed. The polymerization process is substantially free of side reactions comprising double bond migration. The oligomers and polymers are prepared from acyclic polyenes of from 2 to about 30 carbon atoms. The catalyst system comprises a metathesis catalyst (A) comprising a transition metal compound, an activator (B) selected from the group consisting of organic tin compounds and organic aluminum halides and (C) an organic Lewis base. Yields are at least 60% of theoretical based on acyclic polyene reactant.

13 Claims, No Drawings

PROCESS FOR PREPARATION OF UNSATURATED OLIGOMERS OR POLYMERS BY ACYCLIC OLEFIN METATHESIS

BACKGROUND OF THE INVENTION

This invention relates to a process for preparation of unsaturated oligomers or polymers by olefin metathesis of acyclic polyenes employing a catalyst composition comprising a transition metal chloride or ammonium salt, an organic tin compound or an aluminum halide reagent and an organic Lewis base wherein undesired side reactions such as double bond migration are minimized. With acyclic terminal polyene reactants, the process yields unsaturated oligomers or polymers with terminal carbon-to-carbon double bonds and at least one internal carbon-to-carbon double bond. These unsaturated oligomers or polymers with terminal double bonds are suitable for further functionalization or incorporation into other polymers.

Acyclic unsaturated compounds containing functional groups have been prepared by the olefin metathesis reaction. The metathesis of unsaturated ethers, amines and chlorides has been reported (K. J. Ivin, *Olefin Metathesis*, Academic Press, London, N.Y., 149, 1983) as the result of no inherent conflict between the functional groups and the metal carbene bond. However, it is reported that the interaction of the catalyst complex with functional groups of the subject olefin can be critical As is well known, side reactions can occur during olefin metathesis reactions. These side reactions include alkylation, isomerization, cyclization and addition across double bonds present in the molecular structure.

This invention relates to the conversion of acylic polyene hydrocarbons and to a catalyst system for such conversion. In one aspect, this invention relates to the olefin reaction. In another aspect, it relates to the conversion of acyclic polyenes to other olefinic compounds having different molecular weights by disproportion or metathesis of olefins and to the oligomers and polymers derived therefrom which also have terminal double bonds and at least one internal carbon-to-carbon double bond.

The disproportionation or metathesis of olefins is a reaction in which one or more olefinic compounds are transformed into other olefinic compounds of different molecular weights. The disproportionation of an olefin to produce an olefin of higher molecular weight and an olefin of lower molecular weight can be a self-disproportionation reaction as propylene to ethylene and butene, or a double decomposition of two olefins or co-disproportionation of two different olefins to produce still other olefins.

The utility of the olefin disproportion reaction, commonly termed an olefin metathesis reaction, has been recognized as a means to obtain olefinic compounds bearing functional groups such as esters, ethers, halogens and others. However, inasmuch as the olefin metathesis reaction is an equilibrium reaction of unsaturated compounds, the usual consequences of an equilibrium reaction can be present, i.e., yields of the desired product can be low unless a suitable means of driving the reaction to completion can be utilized. Also, the catalyst present to initiate olefinic metathesis can initiate by-product reactions. The reverse of the olefinic metathesis reaction can occur wherein the reaction products self-metathesize to form other olefinic compounds. Terminal olefins have been found to self-metathesize rapidly such as in the industrial process for conversion of propylene to other products. The cis-trans configuration of the final product may be predominantly trans, or predominantly cis, or a mixture of cis-trans, depending upon reaction conditions, including the catalyst utilized.

The disproportionation of olefin bearing functional groups is an especially economically useful reaction in that the products bearing functional groups have been available and valuable for use in polymer formation and chemical transformations to yield industrially valuable products. The term functional groups as it relates to olefins as used herein denotes olefins containing functionality other than hydrocarbyl olefinic terminal unsaturates. Examples of functional groups previously available are esters, hydroxides, amines, halides. However, difunctionalized hydrocarbon oligomers and polymers containing at least one internal carbon-to-carbon double bond wherein the functional groups are terminal carbon-to-carbon double bonds have not been previously prepared from acyclic polyolefins by metathesis reaction except by a difficult and not easily-available catalytic process.

Telechelic polymers having terminal functional groups such as carbon-to-carbon double bonds usable for further reactions, i.e., cross-linking reactions or the construction of other defined polymer structures such as block copolymers, etc., are of great interest from the viewpoint of possible applications. A polymer halogen-terminated at both ends can be reacted with an unilaterally metal-terminated chain of another polymer to produce block copolymers. Hydroxy-terminated polymer chains can be cross-linked with di- and/or tri-polyisocyanates and/or analogous polyfunctional compounds such as acid chlorides of polybasic acids.

Telechelic difunctional polymers have been prepared in the past by termination of living polymers with anionic, cationic and metathesis polymerizations of cyclic olefins. Metathesis polymerizations of cyclic olefins can restrict the availability of products available to those which can be prepared from a relatively few cyclic olefins, typically of from about 5 to about 9 carbon atoms. Difunctional polymers derived from cyclic olefins can be limited in functional groups to those of the precursor cyclic olefins. With acyclic olefins, the olefin metathesis reaction with cleavage and reforming of carbon-to-carbon double bonds and the redistribution of alkylidene moieties leads to a random product distribution at equilibrium (Kirk-Othmer, *Ency. Chem. Tech.*, 597, 3rd Ed., Vol. 8). Difunctional telechelic hydrocarbon oligomers/polymers produced via anionic or free-radical polymerizations of acyclic olefins typically are mixtures of polymer structures. For example, alpha-omega difunctional polybutadienes prepared by anionic or free-radical polymerization of butadiene contain mixtures of 1,4- and 1,2-polybutadiene structures, have molecular weights of 1000–4000 and are terminated with hydroxy or carboxy functionalities. Typically, the functionalities are less than difunctional, the functionality number being less than 2, and greater than difunctional, the functionality number being greater than 2.

DESCRIPTION OF THE PRIOR ART

Previous procedures to prepare polymeric hydrocarbons having reactive functional end groups frequently have utilized cyclic olefinic compounds in conjunction with a ring opening step. Ofstead, U.S. Pat. No. 3,597,403, teaches a process for ring-opening polymerization of unsaturated alicyclic compounds, preferably unsaturated alicyclic compounds of a single unsaturated alicyclic ring containing at least four carbon atoms and not more than five carbon atoms wherein the carbon-to-carbon double bonds in the ring are not adjacent and are non-conjugated in the presence of a catalyst system comprising an alkylaluminum halide, molecular oxygen, and a compound of tungsten or molybdenum. Streck, et al., U.S. Pat. No. 3,798,175 teaches a process for ring opening polymerization of cyclic olefins and forming terminal carbalkoxy groups by employing a catalyst system consisting essentially of (1) a tungsten or molybdenum compound, (2) an organo aluminum compound, (3) an unsaturated carboxylic acid ester. Streck, et al., U.S. Pat. No. 3,857,825, discloses a process for production of polymeric hydrocarbons having reactive silyl end groups by a ring-opening polymerization of a cyclic olefin in the presence of a catalytic amount of a halogenated compound of a metal selected from the group consisting of niobium, tantalum, molybdenum, tungsten and rhenium and a halogen, alkoxy, carboxylate or Lewis acid.

Accordingly, although the prior art teaches the preparation of polymeric hydrocarbons having functional end groups such as esters, amines, hydroxies and other reactive groups, investigators have continued to search for an acyclic diolefin metathesis process and catalyst for preparation of difunctional oligomers and polymers wherein the functional groups are terminal double bonds.

Wagener, et al. *Makromol. Chem.* 191, 365–374 (1990) reported a successful acylic diene metathesis polymerization wherein vinyl terminated oligo(octenylene)s were synthesized using a Lewis acid free catalyst, W(CH-t-Bu) (N-2,6-$C_6H_3$—i—$Pr_2$)(OCMe($CF_3$)$_2$)$_2$, the catalyst taught by Schrock, et al. *J. Am. Chem. Soc.* 110, 1423 (1988). Ratio of reactant to catalyst was in a mole ratio of 500:1. Yields were reported as essentially quantitative.

However, the catalyst composition reported as used by Wagener has not been disclosed as commercially available and is difficult and expensive to prepare.

Olefin metathesis Lewis acid catalysts systems have been extensively reported in the prior art. Calderon, et al., U.S. Pat. No. 3,597,406, teach the polymerization of hydrocarbon substituted cyclic compounds by a ring-opening polymerization of hydrocarbon substituted cyclooctadienes in the presence of a Lewis acid catalyst system comprising (A) at least one organometallic compound wherein the metal is selected from the group consisting of Ia, IIa, IIb, and IIIa of the Periodic Table of Elements, (B) at least one transition metal salt selected from the group consisting of tungsten and molybdenum halides, and (C) at least one compound of the general formula R-Y-H wherein Y is oxygen, H is hydrogen and R is a radical selected from the group consisting of (1) hydrogen (2) alkyl, (3) aryl, (4) arylalkyl., (5) alkaryl, (6) alkenyl and radicals thereof. Ofstead, U.S. Pat. No. 3,935,179, teaches a Lewis acid catalyst comprising (A) tungsten or molybdenum halides, (B) alkyl aluminum halides, and (C) an alcohol which may optionally contain a halogen constituent, and (D) an alcohol which has a nitrile substituent for ring opening polymerization of cycloolefins by cleavage of the carbon-to-carbon double bonds. Ring-opening polymerizations of cyclic olefins in presence of a Lewis acid catalyst are also taught in U.S. Pat. Nos. 3,974,092; 3,974,094; 4,010,224; 4,020,254; and 4,172,932.

Olefin metathesis Lewis acid catalyst systems for polymerizing and copolymerizing diolefins have been taught in the prior art wherein the catalyst system is comprised of a Lewis acid and a particular compound which permits carrying out the polymerization and copolymerization reactions starting with diolefins to give products of desired properties.

For example, U.S. Pat. No. 4,429,089 teaches a catalytic system for polymerizing and copolymerizing diolefins comprising a Lewis acid, an aluminum compound and a particular compound belonging to the lanthanide series to give products having a high content of 1,4-cis units and high molecular weights from aliphatic conjugated diolefins such as 1,3-butadiene, 1,3-pentadiene, isoprene and their mixtures. U.S. Pat. No. 4,469,809 teaches a two-part metathesis-catalyst system wherein the first part of the catalyst system is comprised of a metathesis catalyst, preferably, $WOCl_4$, $WCl_6$, and a Lewis base to moderate the polymerization rate of a tungsten/monomer solution, the monomer preferably dicyclopentadiene. The second part of the catalyst system comprises an activator such as tetrabutyl tin, triethylaluminum and similar compounds. The activator solution includes an ester, ether, ketone or nitrile which serves to moderate the rate of polymerization. Similar catalyst systems are taught in U.S. Pat. Nos. 4,520,181; 4,699,963; and 4,918,039 wherein a Lewis base was used to moderate the polymerization reaction of a Lewis acid. U.S. Pat. No. 4,918,039 teaches that in the presence of a transition metal halide and a catalyst activator comprising an alkyl tin reagent, the presence of a Lewis base to stabilize the polymerization reaction can be omitted since an alkyl tin activator is a poorer Lewis acid. U.S. Pat. No. 4,977,226 teaches a ring-opening process for polymerizing a norbornene monomer in the presence of a metathesis catalyst system comprising a tungsten compound such as tungsten hexachloride in the presence of a Lewis base to prevent premature polymerization.

With the exception of the teachings of Wagener, *Makromol Chem.* 191, 365–374 (1990), prior investigators have not dealt with the problem of preparing difunctional terminal diolefin oligomers and/or polymers having at least one internal carbon-to-carbon double bond wherein the functional groups are terminal carbon-to-carbon double bonds from acyclic terminal diene reactants. As detailed above, Lewis acid catalysts are taught in the preparation of olefinic compounds via a ring opening reaction. The effect of the presence of Lewis base upon the rate of polymerization by a Lewis acid of an olefinic compound has been recognized but there has been no teaching or inference that a metathesis catalyst system comprising a Lewis acid, an activator and a Lewis base can be used to prepare difunctional terminal carbon-to-carbon polyolefin oligomers and/or polymers from acyclic terminal polyene reactants.

K. Ichikawa, et al., *J. Org. Chem.*, 41, 2633–2635 (1976) taught use of a Lewis base catalyst as being effective for reactions of 1-alkenes using a $WCl_6/Bu_4Sn$ catalyst with addition of esters, acetonitrile, phenylacetylene, dicyclopentadiene and ethers to improve the selectivity to the metathesis reaction by depressing side reactions. The reactants were 1-pentene, 1-hexene, 1-heptene, 1-octene and 1-decene. The optimum range of the Sn/W mole ratio was from 2:1 to 8:1. The ratio of 1-octene to $WCl_6$ was 20–400. Products were ethylene and a symmetric internal alkene.

It is accordingly surprising and unexpected that difunctional oligomers and/or polymers wherein the functional groups are terminal double bonds can be prepared from acyclic terminal polyene reactants in the presence of a Lewis acid catalyst component comprising a transition metal chloride or ammonium salt, an activator comprising an organic tin compound or an aluminum halide and an organic Lewis base.

It is therefore an object of this invention to provide a simple catalyst system which is effective in metathesizing acyclic polyenes to unsaturated oligomers and/or polymers, which does not cause the vinyl addition reaction by causing the formation of carbocations, and, with terminal polyene reactants, yields unsaturated difunctional oligomers and/or polymers having at least one internal carbon-to-carbon double bond, wherein functional groups are terminal carbon-to-carbon double bonds. It is further an object of this invention to provide a catalytic process for the preparation of unsaturated difunctional oligomers and/or polymers wherein functional groups are terminal carbon-to-carbon double bonds. It is further an object of this invention to provide unsaturated difunctional oligomers and/or polymers wherein functional groups are terminal carbon-to-carbon double bonds and thus are positioned for further functionalization and/or incorporation into other reactive compounds. The terminal carbon-to-carbon double bonds can be reacted to prepare ester, hydroxy, amine, and other compounds, and are suitable for further functionalization or incorporation into other polymers.

SUMMARY OF THE INVENTION

This invention relates to a polymerization process for preparation of unsaturated functional oligomers and/or polymers wherein functional groups are terminal carbon-to-carbon double bonds. The reactants are acyclic polyenes with terminal carbon-to-carbon double bonds. The polymerization process is substantially free of side reactions comprising double bond migration. The catalyst comprises a composition of a transition metal chloride or ammonium salt, an organic tin compound or aluminum halide, and an organic Lewis base. The unsaturated functional oligomers and/or polymers having at least one internal carbon-to-carbon double bond and wherein functional groups comprising terminal carbon-to-carbon double bonds can be further reacted to prepare ester, hydroxy, amine, and other compounds and are suitable for further functionalization or incorporation into other polymers.

DETAILED DESCRIPTION OF THE INVENTION

The present invention relates to a polymerization process for preparation of unsaturated oligomers and/or polymers, with terminal carbon-to-carbon double bonds and having at least one internal carbon-to-carbon double bond, from acyclic terminal polyene reactants in the presence of a metathesis catalyst comprising (A) a transition metal compound (B) an activator comprising an organic tin or aluminum halide compound and (C) an organic Lewis base. The ratios of three components are in the range of from 1.0:0.1:0.1 to 1.0:200:200, preferably 1.0:2.0:2.0. As the diene (polyene) contains terminal double bonds, the oligomers or polymers produced will contain terminal double bonds. The level of conversion of the polyene determines the molecular weight of the products: low conversion will yield oligomers, high conversion will yield polymers. Mixtures of polyenes may be employed as reactants. The unsaturated oligomer products are suitable for use as reactants to yield higher molecular weight materials.

Reaction temperatures in the range of from about 0° C. to lower than reflux temperatures, without reflux, of the reactants, will result in lower conversion and yield lower molecular weight oligomers and/or polymers. A higher reaction temperature to about 200° C. with reflux and inert gas purge typically will result in higher conversion and yield higher molecular weight polymers than oligomers and/or polymers obtained at less than reflux temperature and without reflux and inert gas purge.

As the methathesis catalyst component (A), there can be mentioned halides, oxyhalides, oxides and organic ammonium salts of tungsten, molybdenum, rhenium and tantalum. As preferred examples, there can be mentioned tungsten compounds such as tungsten hexachloride, tungsten oxytetrachloride, tungsten oxide, tridodecylammonium tungstate, methyltricaprylammonium tungstate, tri(tridecyl)ammonium tungstate and trioctylammonium tungstate, molybdenum compounds such as molybdenum pentachloride, molybdenum oxytrichloride, tridecylammonium molybdate, methyltricaprylammonium molybdate, tri(tridecyl)ammonium molybdate and trioctylammonium molydate, rhenium compounds such as rhenium pentachloride, and tantalum compounds such as tantalum pentachloride. Use of a catalyst soluble in the monomer used for the reaction is preferred. Where the catalyst is a halide, the catalyst can be solubilized by treating the catalyst with an alcohol or phenol compound in advance.

Organic tin compounds, alkylaluminum halides, alkoxy-alkylaluminum halides and aryloxy-alkylaluminum halides can be used as the activator (co-catalyst) (B). As preferred examples, there can be mentioned tetrabutyltin, tetramethyltin, tetraethyltin, tetraphenyltin, ethylaluminum dichloride, diethylaluminum monochloride, ethylaluminum sesquichloride, diethylaluminum iodide, ethylaluminum diiodide, propyaluminum dichloride, propylaluminum diiodide, isobutylaluminum dichloride, ethylaluminum dibromide, methylaluminum sesquichloride, methylaluminum sesquibromide, and precondensates of alkylaluminum halides with alcohols.

The Lewis base (C) useful in this invention includes, alkyl acetates of from 3 to 30 carbon atoms, acetonitrile, acetylacetone, tetrahydrofuran, pyridine, N,N-dimethylformamide, thiophene, ethyl ether, propyl ethers, diphenyl ether, triethylamine, organic phosphorus compounds, monohydric and dihydric alcohols having 1 to 30 carbon atoms such as methyl alcohol, ethyl alcohol, n-propyl alcohol, isopropyl alcohol, n-butyl alcohol, isobutyl alcohol, tert-butyl alcohol, n-pentyl alcohol, isopentyl alcohol, 2-methyl-1-butyl alcohol, 2-methyl-2-butyl alcohol, n-hexyl alcohol, n-heptyl alcohol, n-octyl alcohol, isooctyl alcohol, 2-ethylhexyl alcohol, n-nonyl alcohol, n-decyl alcohol, 1,5-pentanediol, 1,6-hexanediol, allyl alcohol, crotyl alcohol, 3-hexene-1-ol, citronellol, cyclopenatnol, cyclohexanol, salicyl alcohol, benzyl alcohol, phenethyl alcohol, cinnamyl alcohol, and the like. The Lewis base (C) is preferably an ester, such as an alkyl acetate, instead of an alcohol. A nitrile such as acetonitrile, is preferable to pyridine.

In the process of preparing the catalyst, the constituent (A) of the catalyst complex preferably is dissolved first in a hydrocarbon solvent, followed by dissolving constituent (C) in the solvent. Constituent (B), the activator, is added to the solvent last. The then obtained catalyst is used to prepare the unsaturated oligomers and/or polymers.

In general, any type of non-conjugated diene or polyene, of up to about 30 carbon atoms, aliphatic or aromatic can be oligomerized or polymerized. Examples include 1,5-hexadiene, 1,9-decadiene, 1,5,9-decatriene, divinylbenzene and mixtures thereof.

The methathesis catalyst comprising (A), the transition metal compound, is used in an amount of about 0.01 to about 50 milimoles, preferably 0.1 to 10 milimoles, per mole of the monomer. The activator (co-catalyst) (B) is used at a molar ratio of from 0.1 to 200, preferably from 1 to 10, per mole of the catalyst component (A).

Preferably both the metathesis catalyst and the activator are used when dissolved in the monomer, but the catalyst and activator can be used when suspended or dissolved in a small amount of a solvent, as long as the properties of the product are not substantially degraded.

In producing the lower-molecular weight oligomers, it is sufficient if the above mentioned acylic polyene monomer and the metathesis catalyst system are used, and the final product is obtained by adding a polymerization stopper when the viscosity of the product reaches a predetermined level after initiation of the polymerization.

Any reagent for deactivating the activator or the metathesis catalyst system, for example, an alkylaluminum chloride, or the catalyst component of the metathesis catalyst system, for example, a tungsten compound catalyst or a molybdenum compound catalyst, can be used as the stopper for the polymerization reaction. As preferred examples, there can be mentioned alcohols such as methanol, ethanol, n-propyl alcohol and n-butanol, amines such as ammonia, organic acids such as acetic acid and propionic acid, oxygen, and carbon dioxide.

If an appropriate amount of an alcohol is used as the stopper for the reaction, only the activator such as an aluminum compound is deactivated but the catalyst component such as a molybdenum catalyst is left in the liquid product while retaining the activity. Of course, a stopper capable of deactivating both of the activator and the catalyst component can be used. In the polymization reaction, the methathesis catalyst component is used in an amount of 0.01 to 10 millimoles, preferably 0.1 to 2 millimoles, per mole of the whole monomers. The activator (cocatalyst) is used at a molar ratio of from 0.1 to 200, preferably from 1 to 10, to the catalyst component. It is sufficient if the stopper for the polymization reaction is used in an amount enough to deactivate the catalyst system. The amount differs according to the kind of the activator or the catalyst component, but the amount can be easily determined by preliminary experiments. For example, where a dialkylaluminum halide is used as the activator and an alcohol is used as the stopper for the viscosity-increasing reaction, it is sufficient if the alcohol is used in an amount of at least 2 moles per mole of the activator.

In the event one part of the catalyst system comprises the tungsten containing catalyst, the tungsten compound is first suspended in an amount of a suitable solvent. The solvent must not be susceptible to halogenation by the tungsten compound. Examples of preferred solvents are benzene, toluene, xylene, cyclohexane, chlorobenzene, dichlorobenzene and trichlorobenzene.

The metathesis oligomerization/polymerization is preferably performed in liquid phase, with catalyst components dissolved in a solvent or liquid diene (polyene) reactant. Reaction temperatures are preferably from about 0° C. to 200° C. Pressure typically is in the range of from about $1\times10^{-6}$ mm Hg to about 30 atmospheres. Preferably pressure is in the range of from about $1\times10^{-6}$ mm Hg to about one atmosphere. If high molecular weight polymer is desired as product, the light olefin coproduct (ethylene in the case of terminal diene reactants) should be removed efficiently to drive the reaction to high conversion.

In the practice of this invention, the catalyst system preferably comprises a tungsten metal chloride, a tetraalkyl tin reagent and an organic Lewis base selected from the group consisting of an alkyl acetate, a nitrile, an ether, an amine and an alcohol. Inasmuch as the tungsten catalyst in the presence of an activator such as a tetraalkyl tin compound, in the absence of a Lewis base, can catalyze side reactions in a metathesis reaction of an olefin compound, a sequence of mixing the components of the catalyst system is preferable.

The tungsten compound is preferably suspended in a small amount of a suitable solvent, preferably in the monomer if the tungsten compound is soluble in the monomer. An alcoholic or phenolic compound is suitable, phenolic compounds being preferred over an alcoholic compound. Suitable phenolic compounds include phenol, alkyl phenols, and halogenated phenols, with tert-butyl phenol, tert-octyl phenol and nonyl phenol most preferred. The preferred molar ratio of the tungsten compound/phenolic compound is from about 1:1 to about 1:3. The tungsten compound/phenolic compound solution can be prepared by adding the phenolic compound to the tungsten compound, stirring the solution and then blowing a stream of a dry inert gas through the solution to remove any hydrogen chloride.

The addition of the Lewis base or a chelating agent can be in an amount of from about 0.1:1 to about 200:1 moles of Lewis base or chelating agent per mole of tungsten compound. Preferred chelants include acetylacetone, alkyl acetoacetates where the alkyl group contains from 1 to 10 carbon atoms. Preferred Lewis bases include nitriles, ethers and esters such as benzonitrile, tetrahydrofuran, and alkyl acetates of from 3 to about 30 carbon atoms.

As the olefin metathesis reaction is an equilibrium reaction, as was previously noted, one of the products of the metathesis reaction is an olefin of a lower molecular weight than the starting monomer. It has been found that removal of the olefin of the lower molecular weight is essential to obtain high reaction conversion. This may be accomplished by suitable means such as purging the reaction vessel with inert gas, by applying a low or high vacuum to the system, or by any combination of said means during the reaction, the said steps being in any sequence and capable of being omitted individually. The inert gas can comprise nitrogen, the low vacuum from about 1 mm Hg to about 400 mm Hg, and the high vacuum to about $1\times10^{-6}$ mm Hg.

Accordingly, the instant invention comprises a polymerization process for preparation of oligomers and polymers having at least one internal carbon-to-carbon double bond and containing functional groups which predominantly comprise terminal carbon-to-carbon double bonds, wherein said polymerization process is substantially free of side reactions comprising double bond migration, from acyclic polyenes of from 2 to about 30 carbon atoms, and mixtures thereof, which possess terminal carbon-to-carbon double bonds, by an olefin metathesis reaction, wherein said acyclic polyenes are reacted in the presence of a catalyst system comprising an olefin metathesis catalyst (A) comprising a transition metal compound selected from the group consisting of halides, oxyhalides, oxides and organic ammonium salts of tungsten, molybdenum, rhenium and tantalum; an activator and co-catalyst (B) selected from the group consisting of organic tin compounds, alkylaluminum halides, alkoxyalkylaluminum halides and aryloxy-alkylaluminum halides; and an organic Lewis base (C) wherein said metathesis catalyst (A) is present in an amount of from about 0.01 to about 50 millimoles per mole of said acyclic polyenes, activator (B) is present in a molar ratio to metathesis catalyst (A) of from about 0.1:1 to about 200:1, and Lewis base (C) is present in a molar ratio to metathesis catalyst (A) of from about 0.1:1 to about 200:1. The organic Lewis base (C) can be selected from the group consisting of alkyl acetates of from 3 to 30 carbon atoms, acetonitrile, acetylacetone, tetrahydrofuran, pyridine, N,N-dimethylformamide, thiophene, ethyl ether, propyl ethers, diphenylether, and triethylamine The following examples are exemplary only and are not to be construed as limiting the scope of this invention.

EXAMPLE I

Benzene and toluene solvents (Aldrich Chemical Co., Milwaukee, Wis., HPLC grade) were purified by passage through a column of silica gel and 13X sieves, and stored over 4A sieves. Propyl acetate and tetramethyltin were dried over 4A sieves. 1,5-Hexadiene (98%, Aldrich) was purified by distillation, passage through a column of silica/13X sieves, and storage over 4A sieves.

A 250-mL three-neck round-bottom glass flask (with magnetic stirbar) was fitted with a reflux condenser (on one neck) and stopcock adapters (on the other necks). The apparatus was purged with a nitrogen flow (inlet at a flask neck and outlet at the top of the condenser through an oil bubbler). A catalyst solution was prepared by dissolving, in order, 0.80 g tungsten hexachloride (2 mmol), 0.92 mL propyl acetate (8 mmol), and 0.56 mL tetramethyltin (4 mmol) in 100 mL benzene under nitrogen. The solution was charged into the above-described glass apparatus by cannulation under nitrogen. 1,5-Hexadiene (20.0 mL, 168 mmol) was added via syringe, and the solution was heated to reflux. The solution was maintained at reflux for 25 hours, during which time a slow flow of nitrogen was maintained through the apparatus. GC (FID) analyses of effluent gas detected the presence of significant quantities of ethylene during the first few hours of reflux; no other hydrocarbon gases were detected except for 1,5-hexadiene isomers were detected. After 20 hours of reflux, evolution of ethylene had virtually ceased and hexadiene conversion was estimated at greater than 95%. Heating was ceased after 25 hours.

After cooling, the solution was brown colored and no precipitate was observed. The solution was transferred to a 1-L Erlenmeyer flask. Methanol (1 L) was added slowly while stirring, and a precipitate formed after greater than 50 mL methanol had been added. The solution was decanted off, and the precipitate was dissolved in dichloromethane, transferred to a beaker, and isolated by evaporation of the dichloromethane at room temperature. The residue weighed 6.4 g. The brown, very viscous residue was washed with methanol and dissolved in a minimum of dichloromethane. The solution was concentrated to a volume of 10 mL, methanol (100 mL) was added, and the precipitate was isolated by decantation of remaining fluid. The brownish residue was dried for 4 hours at 70° C. in a vacuum oven, yielding 5.5 g of a brown solid with a highly viscous, waxy consistency. It was fully soluble in chloroform and in dichloromethane. (Sample No. 15103-175-1).

Molecular weight analysis of the product was performed by GPC (with THF solvent and polystyrene calibration), and indicated the material to be a polymer with $M_n=2974$, $M_w=7224$, and polydipersity=2.43.

An IR spectrum of the neat product was obtained using a NaCl cell, and indicated the presence of terminal carbon-to-carbon double bonds (vinyl, —CH=CH$_2$) as well as both cis and trans internal disubstituted C=C double bonds (—CH=CH—):

| IR Band Frequency (cm$^{-1}$) | Band Intensity | Interpretation |
| --- | --- | --- |
| 1668 | weak | trans internal C=C |
| 1653 | weak | cis internal C=C |
| 1640 | weak | terminal C=C (vinyl) |
| 964 | strong | trans internal C=C |
| 911 | medium | terminal C=C (vinyl) |
| 724 | medium, broad | cis internal C=C |

A C-13 NMR was performed of the product dissolved in chloroform-d. The spectrum matched that of 1,4-polybutadiene. Strong singlet resonances were observed at 33.1 ppm and 27.8 ppm in an approximate ratio of 3:1, assigned to methylene carbons adjacent to trans and cis internal carbon-to-carbon double bonds, respectively. Strong resonances were observed at 130.3 ppm and 129.8 ppm along with a few smaller peaks in the 129.9–130.5 ppm range, assigned to internal olefinic carbons. Very weak resonances were observed at 114.9 ppm and 138.7 ppm, clearly assigned as terminal (vinyl) olefinic carbons adjacent to vinyl groups. No other resonances were observed, except for those due to solvent.

In summary, the reaction produced 1,4-polybutadiene with an approximate trans/cis carbon-to-carbon double bond ratio of 3:1 and a GPC number-average molecular weight of 2,970. The isolated yield of polymer is about 60% of the theoretical yield of polybutadiene from 1,5-hexadiene by metathesis polymerization. Selectivity was at least 90%. No benzene-insoluble polymer was produced. IR and C-13 NMR indicate the presence of vinyl groups, providing evidence that polymer chains are terminated by carbon-to-carbon double bonds. The metathesis polymerization reaction was essentially free of the undesired side-reaction of double bond migration, as indicated by the lack of hexadiene isomerization and the lack of any other light olefin co-products besides ethylene.

EXAMPLE II

In this example, a lower reaction temperature was employed without reflux of liquids.

A catalyst solution was prepared by dissolving, in order, 0.40 g tungsten hexachloride (1 mmol), 0.46 mL propyl acetate (4 mmol), and 0.28 mL tetramethyltin (2 mmol) in 50 mL toluene in a 250-mnL round-bottom flask under nitrogen. The flask was connected to an oil bubbler to allow escape of evolved gases. 1,5-Hexadiene (10.0 mL, 84 mmol) was added via syringe, and solution was stirred for 1 hour at room temperature. No gas evolution was observed, so the solution was heated to 50° C. using an oil bath. Gas evolution was observed at 50° C., which FID GC analysis determined to be primarily ethylene with traces of methane and propylene. Vapors of hexadiene and toluene were also observed by GC. The solution was stirred at 50° C. for 18 hours, at which time gas evolution had ceased. A flow of nitrogen was bubbled rapidly through the solution for several minutes, then ceased, and the solution was allowed to stir for about 6 more hours at 50° C. Additional gas evolution, primarily composed of ethylene, was observed during this time. The solution was then cooled to room temperature, and 100 mL methanol was added. No precipitate formed.

An FID GC analysis was performed of the liquid. In addition to solvent peaks, significant peaks were observed at retention times corresponding approximately to $C_{10}$, $C_{14}$, $C_{18}$, $C_{22}$, and $C_{26}$ species. A total of six peaks were detected; the single peaks at approximately $C_{18}$ and $C_{22}$ were the largest.

The liquid from the reaction was extracted using a mixture of pentane and water. Upon mixing, an emulsion formed with was broken up by addition of sodium chloride and bicarbonate. The organic layer was collected, dried with magnesium sulfate, and rotary-evaporated under vacuum at 25°–80° C. to remove solvents. After evaporation, approximately 2 grams of a very pale yellow fluid remained. The fluid, labelled Sample No. 15103-167-2a, was of low viscosity. An IR spectrum of the neat fluid showed a strong band at 1640 cm−1, corresponding to a terminal carbon-to-carbon double bond stretching mode, and a medium-weak band at 1653 cm−1, which is a cis internal carbon-to-carbon stretching mode.

A C-13 NMR was performed of Sample No. 15103-167-2a dissolved in benzene-d6. A complex group of resonances was observed at 129.4–131.6 ppm, varying in intensity from strong to weak, corresponding to internal olefinic carbons. Resonances for terminal olefinic carbons were observed at 114.8 ppm (medium intensity) and 138.5 ppm (medium-weak intensity). A complex group of resonances was observed at 27.1–34-3 ppm, corresponding to methylene carbons. No peaks were detected in the 0–25 ppm range, the usual range of methyl carbons.

These results indicate that relatively low molecular weight aliphatic products were formed in this reaction, i.e., oligomers. IR and C-13 NMR indicate the presence of terminal and internal carbon-to-carbon double bonds. As expected for oligomers, the ratio of terminal to internal carbon-to-carbon double bonds is greater than that of the polymer product of Example I. Since there appear to be no methyl groups in this product, little or no double bond migration took place during the metathesis reaction. This is also indicated by the lack of any substantial amounts of gaseous products other than ethylene. The structure of the oligomeric products is probably $H_2C=CH-CH_2-(CH_2-CH=CH-CH_2)_n-CH_2-CH=CH_2$, where n is about 1–5, in accordance with a metathesis oligomerization. Hexadiene conversion was lower than in Example I due to lower reaction temperature and the lack of reflux action combined with nitrogen purge to remove ethylene product as it was formed.

That which is claimed is:

1. A polymerization process for preparation of oligomers and polymers, having at least one internal carbon-to-carbon double bond and containing functional groups which predominantly comprise terminal carbon-to-carbon double bonds, wherein said polymerization process is substantially free of side reactions comprising double bond migration, from non-conjugated polyenes of up to about 30 carbon atoms, and mixtures thereof, which possess terminal carbon-to-carbon double bonds, by an olefin metathesis reaction, wherein said polyenes are reacted in the presence of a catalyst system comprising an olefin metathesis catalyst (A) comprising a transition metal compound selected from the group consisting of halides, oxyhalides, oxides and organic ammonium salts of tungsten, molybdenum, rhenium and tantalum; an activator and co-catalyst (B) selected from the group consisting of organic tin compounds, alkylaluminum halides, alkoxyalkylaluminum halides and aryloxy-alkylaluminum halides; and an organic Lewis base (C), wherein said metathesis catalyst (A) is present in an amount of from about 0.01 to about 50 millimoles per mole of said polyenes, activator (B) is present in a molar ratio to metathesis catalyst (A) of from about 0.1:1 to about 200:1, and Lewis base (C) is present in a molar ratio to metathesis catalyst (A) of from about 0.1:1 to about 200:1.

2. The process of claim 1 wherein said metathesis catalyst (A) is tungsten hexachloride, activator (B) is tetramethyltin, and Lewis base (C) is propyl acetate.

3. The process of claim 1 wherein said metathesis catalyst (A) is present in a ratio of from about 0.1 to 10 millimoles per mole of said polyenes and said activator (B) and said Lewis base (C) are each present in a ratio to said metathesis catalyst (A) of from about 1:1 to about 10:1.

4. The process of claim 1 wherein said organic Lewis Base (C) is selected from the group consisting of alkyl acetates of from 3 to 30 carbon atoms, acetonitrile, acetylacetone, tetrahydrofuran, pyridine, N,N-dimethylformamide, thiophene, ethyl ether, propyl ethers, diphenylether, and triethylamine.

5. The process of claim 1 wherein said polymerization is at a temperature within the range of from about 0° C. to about 200° C. and pressure is within the range of from about $1\times10^{-6}$ mm Hg to about 30 atmospheres.

6. The process of claim 1 wherein said olefin metathesis reaction is driven to high conversion by removal from said olefin metathesis reaction the low molecular weight co-product olefins produced by said olefin metathesis reaction of said acyclic polyenes.

7. The process of claim 6 wherein said low molecular weight co-product olefins are removed from said process by purging the olefin metathesis reaction with an inert gas during said reaction.

8. The process of claim 6 wherein said low molecular weight co-product olefins are removed from said process by application of a vacuum in the range of from about 1 mm Hg to about 400 mm Hg during said reaction.

9. The process of claim 6 wherein said low molecular weight co-product olefins are removed from said process by application of a vacuum from about 1 mm Hg to about $1\times10^{-6}$ mm Hg during said reaction.

10. The process of claim 6 wherein said low molecular weight co-product olefins are removed from said process by a combination of steps comprising a purge of the olefin metathesis reaction with an inert gas, application of a low vacuum in the range of from about 1 mm Hg to about 400 mm Hg during said reaction, and an application of a high vacuum from about 1 mm Hg to about $1\times10^{-6}$ mm Hg, said steps being in any sequence and capable of being omitted individually.

11. The process of claim 1 wherein yield is at least 60% of theoretical based on polyene reactant.

12. The process of claim 1 wherein said metathesis catalyst (A) is tungsten hexachloride, activator (B) is tetramethyltin, Lewis base (C) is propyl acetate, diene is 1,5-hexadiene, and product of said process is a polymer with $M_n=2974$, $M_w=7224$ and polydispersity=2.43, yield of polymer is about 60% of theoretical yield of polybutadiene from 1,5-hexadiene and the polymer chain is terminated by carbon-to-carbon double bonds.

13. The process of claim 1 wherein said polyenes are selected from the group consisting of 1,5-hexadiene, 1,9-decadiene, 1,5,9-decatriene, divinylbenzene and mixtures thereof.

* * * * *